United States Patent [19]

Elliott et al.

[11] 4,083,791

[45] Apr. 11, 1978

[54] LUBRICATING OIL CONTAINING REACTION PRODUCTS OF POLYISOBUTYLPHENOL, ESTERS OF CHLOROACETIC ACID, AND ETHYLENE POLYAMINE

[75] Inventors: John Scotchford Elliott, Beaconsfield; Bryan Terence Davis; Richard Martin Howlett, both of Wokingham, all of England

[73] Assignee: Edwin Cooper and Company Limited, Bracknell, England

[21] Appl. No.: 677,672

[22] Filed: Apr. 16, 1976

Related U.S. Application Data

[63] Continuation-in-part of Ser. No. 490,953, Jul. 23, 1974, abandoned.

[30] Foreign Application Priority Data

Jul. 23, 1974  United Kingdom ............... 35732/74

[51] Int. Cl.$^2$ ................... C07C 103/127; C10M 1/36; C10M 3/30
[52] U.S. Cl. ............................ 252/51.5 A; 260/559 B; 260/404
[58] Field of Search ............... 252/51.5 A; 260/559 B

[56] References Cited

U.S. PATENT DOCUMENTS

| | | | |
|---|---|---|---|
| 3,131,150 | 4/1964 | Stuart et al. | 252/51.5 A X |
| 3,310,492 | 3/1967 | Benoit | 252/51.5 A |
| 3,360,464 | 12/1967 | Otto | 260/559 B X |
| 3,542,678 | 11/1970 | Bock | 252/51.5 A |
| 3,558,743 | 1/1971 | Verdol et al. | 252/51.5 A |

FOREIGN PATENT DOCUMENTS

| | | | |
|---|---|---|---|
| 825,212 | 10/1969 | Canada | 252/51.5 A |
| 984,409 | 2/1965 | United Kingdom | 252/51.5 A |

Primary Examiner—Allen B. Curtis
Attorney, Agent, or Firm—Donald L. Johnson; Robert A. Linn; Joseph D. Odenweller

[57] ABSTRACT

Amides of $C_{50-200}$ alkylphenoxy-substituted aliphatic carboxylic acids made by reacting a $C_{50-200}$ alkylphenol with a halocarboxylic ester (e.g., butyl chloroacetate) followed by displacement of the ester group with an amide group have a much higher content of amide than a product made using a halocarboxylic acid reactant in place of the ester. The product is an effective lubricating oil dispersant.

6 Claims, No Drawings

LUBRICATING OIL CONTAINING REACTION PRODUCTS OF POLYISOBUTYLPHENOL, ESTERS OF CHLOROACETIC ACID, AND ETHYLENE POLYAMINE

PRIOR APPLICATION

This application is a Continuation-in-Part of application Ser. No. 490,953, filed July 23, 1974 now abandoned.

BACKGROUND

This invention relates to lubricant additives, more particularly to certain novel compounds useful as lubricant additives, or which in certain cases may be useful in the preparation of lubricant additives.

Amongst the numerous types of additives used in blending lubricants, particularly but not exclusively automotive lubricants, are various surface active materials. For example, dispersants, particularly ashless dispersants, are incorporated in lubricants in order to disperse carbon particles and other insoluble materials such as decomposition products and fuel oxidation products in the oil medium which is the major constituent of the lubricants. The insoluble materials are thus suspended in the oil medium and prevented from forming deposits which can deleteriously affect engine operation.

SUMMARY

According to the present invention there is provided a reaction product containing an amide of an alkyl-phenoxy-substituted aliphatic carboxylic acid wherein the alkyl group substituted on the phenoxy moiety contains at least 30 carbon atoms.

The present invention also includes a fuel or lubricant composition comprising a major amount respectively of a liquid hydrocarbon fuel or lubricating oil and a minor amount of an amide of an alkylphenoxy-substituted aliphatic carboxylic acid, wherein the alkyl group substituted on the phenoxy moiety contains at least 30 carbon atoms.

In British Pat. No. 1,464,721 there is provided a compound which is a condensation product of an alkyl-substituted phenol, preferably a p-alkyl-substituted phenol, in which the alkyl substituent contains at least 8 carbon atoms and at least one halogen-substituted, preferably α-halogen substituted, aliphatic carboxylic acid or preferably ester thereof. The carboxylic acid may be substituted by two or more halogen atoms, but preferably has a single halogen atom substituent. For the purpose of the condensation reaction by which the compounds may be prepared, bromine is more suitable than chlorine as the halogen substituent as the former is more reactive. However, on economic grounds we prefer to use a chloro-substituted carboxylic acid or ester thereof.

In another aspect of the invention of British Pat. No. 1,464,721 there is provided a compound having the general formula:

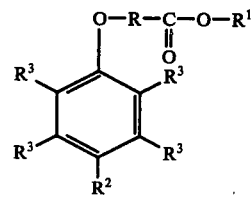

(A)

wherein:
(a) each $R^3$ is the same or different and is a hydrogen atom; an alkyl group containing from 1 to 16, preferably 1 to 4, carbon atoms; a halogen atom, preferably a chlorine atom, or one group $R^3$ in the ortho position relative to the oxygen atom attached to the aromatic nucleus is a group of the formula:

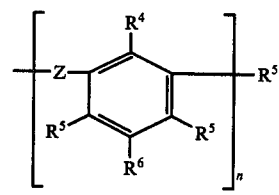

in which
(i) each $n$ is the same or different and is an integer, preferably from 1 to 6;
(ii) each Z is the same or different and is a sulfur chain of formula $+S\!\!\!\!\!-_m$ wherein $m$ is from 1 to 4, preferably 1 or 2; a methylene group; or a residue of a carbonyl-substituted carboxylic acid or derivative thereof which residue has the formula:

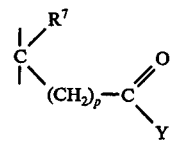

in which each $R^7$ is the same or different and is a hydrogen atom or a methyl group or the group

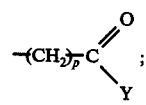

each $p$ is the same or different and is an integer, preferably zero, 1 or 2, or most preferably zero; each Y is the same or different and is a hydroxyl group, an alkoxy group, an amino group or the group $—O^-M^+$ in which $M^+$ is an ammonium, amino or monovalent metal cation;

(iii) each $R^4$ is the same or different and is a hydrogen atom; an alkyl group containing from 1 to 16, preferably 1 to 4, carbon atoms; a halogen atom, preferably a chlorine atom; a hydroxyl group; a group of formula

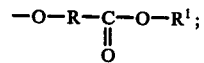

or $R^4$ together with a residue of a carbonyl-substituted carboxylic acid constituting a group Z forms a lactone ring;

(iv) each $R^5$ is the same or different and is a hydrogen atom; an alkyl group containing from 1 to 16, preferably 1 to 4, carbon atoms; a halogen atom, preferably a chlorine atom; or a hydroxyl group provided that not more than one group $R^5$ is a hydroxyl group; and (v) each $R^6$ is the same or different and is a hydrogen atom; an alkyl group containing from 1 to 7, preferably 1 to 4, carbon atoms; a halogen atom, preferably a chlorine atom; or is as $R^2$;

(vi) provided that one group $R^3$ in the ortho position relative to the oxygen atom attached to the aromatic nucleus is a hydrogen or halogen atom or a methyl or ethyl group;

(b) each R is the same or different and is a straight or branched chain alkylene group containing from 1 to 20, preferably 1 to 12, more preferably 1 to 4, carbon atoms;

(c) each $R^1$ is the same or different and is a hydrogen atom or preferably the residue of a hydroxy compound, more preferably the residue of an alkanol containing from 1 to 4 carbon atoms; and (d) each $R^2$ is the same or different and is an alkyl group containing at least 8 carbon atoms.

The group $R^2$ in the foregoing compounds, or in the case of the above defined condensation products of British Pat. No. 1,464,721 the alkyl groups derived from the alkyl-substituted phenols, contain a least 8 carbon atoms and may contain at least 30, preferably at least 50, carbon atoms.

In the case of the above defined condensation products the alkyl-substituted phenol starting material may bear one or more additional substituents on the aromatic ring and these correspond to the groups $R^3$ in the compounds of the foregoing general formula. When no substituent, other than the alkyl substituent corresponding to $R^2$, is present this corresponds to all groups $R^3$ being hydrogen atoms and such compounds are highly preferred.

British Pat. No. 1,464,721 also includes processes for preparing the novel substances of that application. Thus, British Pat. No. 1,464,721 includes a process wherein at least one alkyl-substituted phenol, in which the alkyl substituent contains at least 8 carbon atoms, is condensed with at least one halogen-substituted aliphatic carboxylic acid or preferably ester thereof. In its preferred aspect the process comprises the condensation of at least one p-alkyl-substituted phenol of the formula:

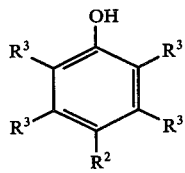

with at least one halogen-substituted aliphatic carboxylic acid or ester thereof of the formula:

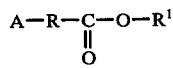

to form a compound of the formula:

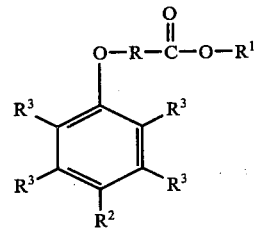 (A)

wherein R, $R^1$, $R^2$ and $R^3$ have the same significance as hereinbefore defined and A is a chlorine or bromine atom. The halogen-substituted carboxylic acid or ester thereof is preferably an α-chloro or α-bromo carboxylic acid or ester thereof and in this case R can be a methylene group (derived from an α-halo-acetic acid or ester thereof) or can be the group

wherein each B is a hydrogen atom or a pendant alkyl group (e.g., 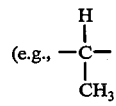

when derived from an α-halo propionic acid or ester thereof).

Thus, the groups R and $R^1$ in the product of the process can be determined by the selection of the appropriate halo-substituted carboxylic acid or ester thereof as starting material.

Although $R^1$ in the above formula of the halogen-substituted aliphatic carboxylic compound can be either hydrogen or the residue of a hydroxy compound, it has been found, according to the present invention, that in order to achieve high conversion of the high molecular weight alkylphenol to alkylphenoxy-substituted aliphatic carboxylic intermediate that it is essential that $R^1$ be the residue of a hydroxy compound. $R^1$ is preferably derived from an alkanol, and most preferably from a lower monohydric alkanol such as methanol, ethanol, propanol, isopropanol, n-butanol, isobutanol, sec-butanol, n-pentanol, and the like.

Alternatively, the hydroxy compound of which $R^1$ is a residue can be a di- or poly-hydroxy compound and the residue will have unused hydroxyl groups; or the hydroxy compound can be a di- or poly-hydroxy compound in which one or more, but not all, the hydroxyl groups have been replaced by groups of the formula:

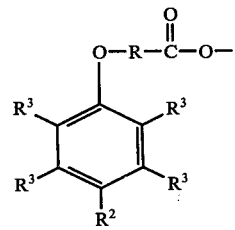

additional to that shown in the foregoing formula (A).

When $R^1$ in the formula of the halogen-substituted aliphatic carboxylic compound is an alkanol residue the compound of formula (A) which is formed is an ester. These ester intermediates are prepared in accordance with the process in British Pat. No. 1,464,721. As will be described in detail, the ester intermediate is then reacted with an amine to displace the alkanol residue and form an amide dispersant. Accordingly, a highly preferred embodiment of this invention is a lubricating oil dispersant containing an alkylphenoxy-substituted aliphatic carboxylic amide which is prepared by the process comprising (i) reacting an alkyl-substituted phenol in which the alkyl substituent contains over 30, and preferably from about 50-200, carbon atoms with a halocarboxylic ester wherein said halo is selected from chlorine and bromine to form an intermediate mixture containing alkylphenoxy-substituted aliphatic carboxylic ester, and (ii) reacting this intermediate mixture with an amide-forming amine to convert the carboxylic ester to carboxylic amide. The resultant product includes all the components that are formed in the reaction and also includes any unreacted alkylphenol which is for all practical purposes inseparable.

Examples of suitable halogen-substituted aliphatic carboxylic esters are methyl chloroacetate, ethyl chloroacetate, n-propyl bromoacetate, n-butyl chloroacetate, isobutyl bromoacetate, n-amyl bromoacetate, iso-hexyl bromoacetate, n-butyl 2-chloropropionate, iso-amyl 2-bromobutyrate, and the like.

The precise nature of the groups $R^2$ and $R^3$ may be determined by the selection of the appropriate alkyl-substituted phenol starting material; and in addition, in one particular case described hereinafter, by the reaction conditions. Thus, when each $R^3$ is a hydrogen or halogen atom or an alkyl group this is provided by selecting the appropriately substituted phenol starting material. Similarly, compounds in which $R^3$ is a group of formula:

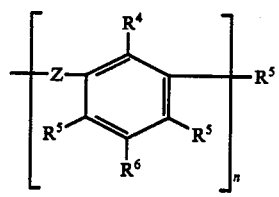

can be prepared from phenol sulfides or derivatives thereof having the appropriate substituents to provide the requisite groups $R^4$, $R^5$ and $R_6$. In this case Z will be a sulfur chain. Compounds in which Z is a methylene group likewise can be prepared from the appropriate o-methylene phenyl derivatives. A particularly useful source of o-methylene phenyl derivatives are phenol/-formaldehyde condensation products. Lastly, products in which Z is a residue of a carbonyl-substituted carboxylic acid or derivative thereof can be prepared by using, as starting materials, the substances which form the subject matter of our U.S. Pat. Nos. 3,954,808 and 3,966,807. These substances may be prepared by condensing an alkyl-substituted phenol with a carbonyl compound, e.g., of formula:

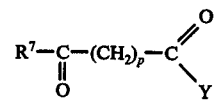

wherein $R^7$, p and Y are as hereinbefore defined, as more fully described in said copending applications.

In all the foregoing variations the alkylphenol starting materials bear the appropriate substituents which, with one exception, constitute the groups $R^4$, $R^5$ and $R^6$. The exception arises when $R^4$ is a hydroxyl group. In this case the starting material will contain two or more phenolic hydroxyl groups and the halo-substituted carboxylic ester may be employed in an amount sufficient to react with a single phenolic hydroxyl group or with all such groups.

Examples of preferred alkyl-substituted phenols are p-$C_{50}$-polyisobutylphenol, p-$C_{60}$-polyisopropylphenol, p-$C_{200}$-polyisobutyl-o-cresol, p-$C_{100}$-polyisopropyl-o-ethylphenol, p-$C_{75}$-polyisobutyl-m-cresol, p-$C_{90}$-polyisopropyl-2,6-xylenol, p-$C_{100}$-polyisobutyl-o-tert-butylphenol, p-$C_{80}$-polyisopropyl-o-sec-butylphenol, and the like. The alkylphenols are predominantly para, although minor amounts of other isomers such as the corresponding ortho-alkylphenols which inherently form in the alkylation of phenol are also present. The most preferred alkylated phenol starting materials are the polyolefin-substituted phenols, for example, phenols substituted with polypropylene or polyisobutylene containing about 50-200 carbon atoms.

It is highly desirable to employ an acid acceptor to neutralize the hydrogen halide liberated in the condensation of the alkylphenol with the halo-substituted carboxylic ester. Such acid acceptors are well known and any suitable material can be used for this purpose, e.g., a tertiary base such as a pyridine. However, the preferred acid acceptor is a metal base such as an alcoholic solution of an alkali metal hydroxide, particularly sodium or potassium hydroxide or an alkali metal or alkaline earth metal alkoxide. The latter can be readily prepared by dissolving the metal in an alcohol, such as methanol or ethanol, in well-known manner. The acid acceptor is preferably used in the stoichiometric quantity required to neutralize the hydrogen halide. All the base required to neutralize the hydrogen halide may be added initially or the base may be added in portions throughout the reaction. The portion-wise addition of the acid acceptor is the preferred technique.

The condensation reaction proceeds very readily in the presence of the acid acceptor and may be carried out at ambient temperature. Conversely, comparatively high reaction temperatures can also be used up to the decomposition temperature of the reaction mixture. However, to provide a more easily controllable reaction at a rate more rapid than at ambient temperature, a compromise reaction temperature of from 60° to 150° C is preferable, a temperature of from 70° to 100° C being the optimum reaction temperature. Under these conditions the reaction is usually complete within one hour, completion being denoted when no further base is consumed. Dropwise addition of the acid acceptor facilitates the indication of the completion of the reaction in this way. Alternatively, a pH indicator or a pH meter may be used.

If desired, the condensation reaction may be carried out in an inert solvent reaction medium, such as a hydrocarbon solvent or alkanol solvent. Examples of such inert solvents are benzene, toluene, xylene, n-butanol, 2-ethylhexanol and mineral oil, especially a mineral oil of lubricating viscosity.

After completion of the reaction the product may, if desired, be washed with water to remove the halide salt of the acid acceptor formed during the reaction. Alternatively, the reaction product may be acidified and washed with aqueous alcohol, e.g., aqueous methanol.

The reaction of the halocarboxylic ester with the alkylphenol proceeds to give a high conversion of alkylphenol to alkylphenoxy alkanoic esters, generally in conversions in excess of 60%, and more often in excess of 75%. When the similar reaction is attempted using halocarboxylic acids instead of esters conversions are much lower, generally below 50%. This is a highly important distinction when making the present reaction product because of the very high molecular weight of the alkylphenol. Any unreacted alkylphenol cannot readily be separated from the reaction mixture because of its very high molecular weight. Thus, a lower conversion represents an economic penalty. Furthermore, the unreacted alkylphenol remains in the final product after conversion of the alkylphenoxy alkanoic compound to amide which is the active dispersing agent. Hence, the final product obtained according to the present process going through an ester intermediate is significantly different from the product obtained going through the acid intermediate in that it contains much more active dispersant and much less unreacted alkylphenol. This will be shown in the examples.

The present invention is directed to amides of certain of the foregoing novel compounds of British Pat. No. 1,464,721. That is to say, amides containing at least one alkyl substituent containing at least 30 carbon atoms, and preferably 50–200 carbon atoms, and in which the group $-O-R^1$ of foregoing formula (A) is replaced by the residue of an amine or, in the case of the condensation products of British Pat. No. 1,464,721, amides of carboxylic acid groups derived from the halogen-substituted aliphatic carboxylic acid or amides wherein an amine residue replaces the esterifying moiety of carboxylic acid ester groups derived from halogen-substituted carboxylic acid esters.

Accordingly, the present invention includes compounds of the general formula:

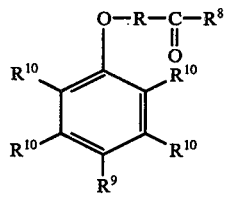

wherein:
(a) R is as hereinbefore defined;
(b) $R^8$ is the residue of an amine;
(c) $R^9$ is an alkyl group containing at least 30 carbon atoms; and
(d) each $R^{10}$ is the same or different and is a hydrogen atom; an alkyl group containing from 1 to 16, preferably 1 to 4, carbon atoms; a halogen, preferably a chlorine, atom; or one group $R^{10}$ in the ortho position relative to the oxygen atom attached to the aromatic nucleus is a group of the formula:

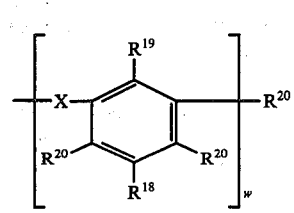

in which
(i) w is an integer of from 1 to 6;
(ii) each X is the same or different and is a sulfur chain of formula $-(-S-)_m$ wherein m is from 1 to 4, preferably 1 or 2; or a methylene group;
(iii) each $R^{19}$ is the same or different and is a hydrogen atom; an alkyl group containing from 1 to 16, preferably 1 to 4, carbon atoms; a halogen atom, preferably a chlorine atom; a hydroxyl group; or a group of formula:

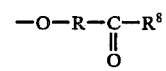

(iv) each $R^{20}$ is the same or different and is a hydrogen atom; an alkyl group containing from 1 to 16, preferably 1 to 4, carbon atoms; a halogen atom, preferably a chlorine atom; a hydroxyl group; or a group of formula

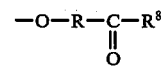

(v) provided that one of, but not more than one of, groups $R^{19}$ and $R^{20}$ is a hydroxyl group; or a group of formula

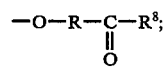

(vi) each $R^{18}$ is the same or different and is a hydrogen atom; an alkyl group containing from 1 to 29, preferably 1 to 4, carbon atoms; a halogen atom, preferably a chlorine atom; or is as $R^9$.

In a preferred form of this embodiment of the invention, $R^9$ is an alkyl group, particularly a branched-chain alkyl group, containing from 50 to 200 carbon atoms. Such alkyl groups may be derived from long-chain olefins such as poly-(alphaolefins), which may have molecular weights in the range of 700 to 3,000, more preferably 900 to 1500, and particularly about 1,000. Examples of suitable poly-(alphaolefins) are polyisobutylenes (PIB) and polypropylenes, such as those commercially available under the trade names Hyvis and Indopol. The preferred groups $R^8$ are residues of aliphatic di- or polyamines, the preferred group R is a methylene group, and the preferred groups $R^{10}$ are hydrogen atoms.

The amide products of the present invention may be prepared from the products of U.K. British Pat. No. 1,464,721 by amidation, using an amine which may be selected from a very wide range of amines such as those having the formula:

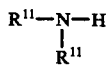

in which each $R^{11}$ is the same or different and is a hydrogen atom or a hydrocarbon, amino-substituted hydrocarbon, hydroxysubstituted hydrocarbon, alkoxy-substituted hydrocarbon, amino, carbamyl, thiocarbamyl or guanyl radical. Preferred amines are di- or polyamino compounds, i.e., wherein at least one group $R^{11}$ is amino-substituted hydrocarbon, and particularly preferred amines are alkylene polyamines having the general formula:

wherein $s$ is an integer and $R^{12}$ is a divalent alkylene radical. Preferably $R^{12}$ is an ethylene radical and $s$ is from 1 to 6, more preferably from 3 to 5. Examples of such amines are ethylene diamine, diethylene triamine, triethylene tetramine, tetraethylene pentamine, pentaethylene hexamine and mixed higher polyethylene polyamines. Other alkylene polyamines such as di(1,2-propylene) triamine, or N-(2-amino ethyl) trimethylene diamine may be employed, if desired. Such alkylene polyamines may be first reacted with a -lactone, preferably -butyro lactone as described in British Pat. Specification No. 1,054,370 or with dicyandiamide as described in British Pat. Specification No. 1,068,235.

Useful higher polyamines have molecular weights from 300 to 1,000 or 5,000, preferably 400 to 600, especially those prepared by polymerizing ethylene imine. The process of polymerizing ethylene imine gives rise to mixtures of polyethylene polyamines having a wide range of molecular weights. These may be divided into mixtures having narrow ranges of molecular weights, those indicated being the most useful in this invention.

Other polyamines which are useful in this invention are commercially available mixtures such as that predominantly consisting of a mixture of isomeric pentaethylene hexamines of formula $C_{10}H_{28}N_6$ and related hexamines containing piperazine rings and 12 C atoms. The average molecular weight of the mixture is approximately that of pentaethylene hexamine, i.e., 233, and the mixture contains a predominance of amines having 2-4 primary amino groups and at least two secondary amino groups.

Other suitable diamino compounds which may be employed are N-dialkylamino alkylamines of the general formula:

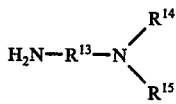

wherein $R^{13}$ is a divalent alkylene radical and $R^{14}$ and $R^{15}$ are alkyl radicals. Examples of such N-dialkylamino alkylamines include dimethylaminomethylamine, dimethylaminoethylamine, dimethylaminopropylamine, dimethylaminobutylamine, dimethylaminoheptylamine, diethylaminomethylamine, diethylaminopropylamine, diethylaminoamylamine, dipropylaminopropylamine, methylpropylaminoamylamine and propylbutylaminoethylamine.

Further suitable diamino compounds are bis(N-aminoalkyl) and N-(β-amino-alkyl) piperazines of formula:

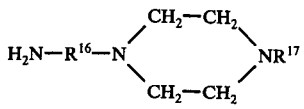

wherein $R^{16}$ is any alkylene radical containing 1 to 3 carbon atoms and $R^{17}$ is a hydrogen atom or a hydrocarbon or aminoalkyl radical containing from 1 to 3 carbon atoms.

Other miscellaneous di- or polyamine compounds which may be used in the invention are N-(2-aminoethyl)ethanolamine and hydroxyethyl triethylene tetramine.

The amine may be reacted with the novel substances of British Pat. No. 1,464,721 in approximately equimolar proportions. In this embodiment, when using the preferred alkylene polyamine co-reactants or other amines initially containing two or more primary amino groups, the resulting reaction product will contain one or more residual primary amino groups. Alternatively, with the preferred linear alkylene polyamines the amine may be reacted with up to twice the molar quantity of the novel substances of British Pat. No. 1,464,721 or even more. It is not necessary to use exactly molar quantities of the two reactants. Useful additives can be obtained by employing, for example, two moles of the novel substances of British Pat. No. 1,464,721 and 1.5 moles of the alkylene polyamine, giving a mixture of products.

Alternatively, the starting materials are reacted in equimolar proportions and one or more residual amino groups are reacted with a carboxylic acid, to form an amine salt, amide thereof or imidazoline or condensed with aldehydes, ketones or mixtures thereof or with mixtures of aldehydes and phenols to form Mannich bases, in manner known per se. Alternatively, the amine may be first reacted with appropriate quantities of the carboxylic acids, aldehydes, ketones or mixtures of aldehydes and phenols to provide an amine having a residual primary or secondary amino group, and the resulting amine reacted with the novel substances of British Pat. No. 1,464,721. In another embodiment of the present invention the amine is an alkylene polyamine in which one primary amino group is reacted, either before or after the amine has been reacted in equimolar proportions with the novel substances of British Pat. No. 1,464,721, with an alkenyl-substituted succinic acid or anhydride thereof containing from 8 to 200 carbon atoms in the alkyl substituent. Such substituents are preferably residues of comparatively low molecular weight polymers or olefins, such as isobutylene or propylene, or oligomers of such olefins. In view of the foregoing, it will be understood that the proportions of the co-reactants may be varied according to the final product required.

The foregoing process of the present invention may be readily carried out by heating the co-reactants together and a preferred reaction temperature is from 50° to 250° C, more preferably 130° to 220° C, most preferably from 180° to 220° C. An inert solvent, such as xylene, toluene or mineral oil may be used.

The reaction may be most conveniently carried out in a vessel which is open to the atmosphere. However, if desired, the reaction can be carried out under vacuum or low pressure conditions or under a nitrogen blanket. The reaction is usually completed within 1 to 6 hours, 2 to 4 hours being most common.

As hereinbefore indicated, the preferred amine starting materials are di- or poly-amino compounds, from which novel products of the present invention can be prepared, which contain two or more nitrogen atoms. Such products are preferred as lubricant additives.

Products derived from ammonia or monoamines, particularly primary or secondary monoamines, may be used as intermediates in place of the esters. Such products may be prepared in the same manner as the novel substances of British Pat. No. 1,464,721 by reaction of an alkyl-substituted phenol with the appropriate amide of a halogen-substituted carboxylic acid. That is to say, the reaction may be carried out in identical manner as in British Pat. No. 1,464,721 except that an amide of a halogen-substituted carboxylic acid is used in place of the acid per se or ester thereof. Preferred amides in this case are those derived from ammonia or monoamines containing 1 to 8, more preferably 1 to 4, carbon atoms. The resulting monoamides may have utility as intermediates in the preparation of lubricant additives. These may be reacted with the preferred di- or poly-amines in a "trans-amidation" reaction analogous to a transesterification reaction. This may be carried out by heating the amides derived from ammonia or monoamines with the preferred di- or poly-amines, for example, at a temperature of 100° to 250° C, more preferably 180° to 220° C, while stripping out the more volatile monoamine or ammonia.

In yet another process the preferred lubricant additives may be prepared in the same manner as the novel substances of British Pat. No. 1,464,721, except in that an amide derived from a di- or poly-amine and a halogen-substituted carboxylic acid is used in place of the acid per se or ester thereof. However, neither of the above is preferred.

As hereinbefore indicated, the present invention includes lubricant compositions containing the novel amides of the present invention, which are preferably used in an amount of from 0.3 to 15% by weight, more preferably 1 to 6% by weight, based on the total weight of the lubricant composition.

Particularly preferred additives in accordance with the present invention are the polybutyl phenoxyacetamides derived from polybutenes of molecular weight 900 – 2800 and polyethylene polyamines having an average of from 4 to 6 amino groups, prepared by reacting polybutyl phenoxyacetic acid or an ester thereof with the polyethylene polyamine in a molar ratio of 2:1 – 1.5.

Also included within the scope of the present invention are additive concentrates comprising a minor amount of a lubricating oil and a major amount of one or more additives in accordance with the present invention, and additive packages comprising a minor amount of a lubricating oil and a major amount of a combination of one or more additives in accordance with the present invention and at least one other lubricant additive.

The lubricating oil used in the lubricating compositions of the present invention may be any of the well-known synthetic ester oils, such as dioctyl sebacate. The preferred oils, however, are mineral oils of lubricating viscosity of well-known type.

The present invention will now be illustrated with reference to the following examples.

EXAMPLE 1

This example illustrates the results obtained when the amide dispersant is prepared through an alkylphenoxy alkanoic acid intermediate. This is not made according to the present invention.

In a reaction vessel was placed 580 g (0.5 m) polyisobutylphenol and 300 ml petroleum ether. To this was added sodium methoxide solution prepared from 11.5 g (0.5 m) sodium and 120 ml methanol. The mixture was heated at reflux for 30 minutes and then solvents were distilled out at 200° C/40 mm for one hour.

To the above phenate was added 300 ml petroleum ether and a sodium methoxide solution prepared from 12.7 g (0.55 m) sodium and 120 ml methanol. While stirring at 70° C, 52 g (0.55 m) of chloroacetic acid was added. The mixture was stirred at reflux for 3 hours.

The resultant mixture was diluted with 500 ml petroleum ether and, while stirring, a solution of 100 ml conc. HCl plus 500 ml water was added. The aqueous phase was then separated, which required additional petroleum ether. The organic phase was washed three times with 90% aqueous methanol. Following this, solvents were distilled out yielding 582 g of an intermediate containing polyisobutylphenoxyacetic acid. The acidity of the mixture was 20.1 mg KOH/g. Theoretical acidity if all of the polyisobutylphenol had been converted to polyisobutylphenoxyacetic acid is 46.1 mg KOH/g. Thus, conversion of polyisobutylphenol to intermediate acid was 43.6% of theory.

To 480 g of the acid intermediate was added 19.5 g of tetraethylenepentamine (1.2 m tetraethylenepentamine per equivalent of acid) and the mixture stirred at 200° C for 5 hours. The resultant product was diluted with 87.6 g of process oil to give 544 g of an 85% concentrate analyzing 1.2 weight % nitrogen and having a total base number of 23.1 mg KOH/g.

EXAMPLE 2

In this example made according to the present invention the amide dispersant was prepared going through an alkylphenoxy acetic ester intermediate. Comparison with Example 1 shows the much higher amounts of active amide dispersant made from the same amount of starting alkylphenol when the product is made according to the present invention.

In a reaction vessel was placed 580 g (0.5 m) of polyisobutylphenol and 300 ml petroleum ether. To this was added a solution of 11.5 g (0.5 m) sodium in 120 ml methanol. The mixture was heated at reflux for 30 minutes and then solvents distilled out at 200° C/40 mm for one hour.

To the above phenate was added 300 ml petroleum ether and 120 ml methanol. While stirring at 70° C, 82.8 g (0.55 m) of butyl chloroacetate was added. The mixture was stirred at reflux for 3 hours. The product was washed three times with 90% aqueous methanol. Following this, the solvent was distilled out yielding 588 g of an intermediate containing butyl polyisobutylphenoxyacetate. Saponification value of the mixture was 36.5 mg KOH/g. Theoretical saponification value if all of the polyisobutylphenol had been converted to butyl polyisobutylphenoxyacetate is 44 mg KOH/g. Thus, conversion of polyisobutylphenol to intermediate ester was 83% — almost double that obtained in Example 1 using chloroacetic acid.

To 480 g of the ester intermediate was added 35.4 g of tetraethylenepentamine (1.2 m tetraethylenepentamine per equivalent of ester) and the mixture stirred at 200° C for 5 hours. The resultant product was diluted with 86.9 g of process oil to give 542 g of an 85% concentrate analyzing 2.08 weight % nitrogen and having a total base number of 51.8 mg KOH/g.

The above comparative tests show that the product obtained according to the present invention via the ester intermediate contains almost double the active dispersant compared to the similar product made via the acid intermediate.

EXAMPLE 3

(a) Preparation of n-Butyl polyisobutylphenoxyacetate

To a solution of PIB phenol (107.0 g, 0.1 m), prepared by alkylation of phenol with 1000 molecular weight polyisobutylene using a $BF_3$/phenol complex as catalyst, and n-butyl chloroacetate (22.6 g, 0.15 m) in xylene (100 ml) was slowly added, over about one hour, a solution of sodium methoxide (8.1 g, 0.15 m) in anhydrous methanol (40 ml). The addition was carried out at 100° C and on completion the solution was heated at this temperature for a further one hour. The solution was washed with 10% hydrochloric acid (50 ml) followed by 3 × 80 ml portions of aqueous methanol (1:4). After being dried over magnesium sulphate the solution was stripped of solvent.

Yield = 102 g.

A sample of this product was saponified with excess aqueous potassium hydroxide, acidified with hydrochloric acid and then washed with portions of aqueous methanol (1:4) until acid free. The acid value of the thus formed PIB phenoxy acetic acid (36.5 mg KOH/g) indicated that a conversion of 73% had been obtained.

(b) Reaction of n-Butyl polyisobutylphenoxyacetate tetra ethylene pentamine to form an amide A mixture of PIB phenoxy butyl acetate (50 g) and tetra ethylene pentamine (3 g) was heated at 200° C for four hours under an atmosphere of nitrogen. After dilution with mineral oil the mixture was filtered to give a clear product.

% nitrogen = 1.8 (calc. = 1.8)
acidity = 5 mg KOH/g
TBN = 37 mg KOH/g

EXAMPLES 4 TO 19

Preparation of n-Butyl polyisobutylphenoxyacetate

A solution of sodium methoxide, prepared by dissolving sodium (43.0 g, 1.87 m) in dried methanol (600 c.c.) was added slowly to a stirred solution of polyisobutyl phenol (1943 g, 1.7 m) (prepared by boron trifluoride catalyzed alkylation of phenol with 1000 M.W. polyisobutylene) and n-butyl chloroacetate (281.4 g, 1.87 m) in xylene (850 c.c.) at 100° C. The addition took 1¾ hours and the solution was then stirred at 69° C for 2 hours.

The solution was stirred with hydrochloric acid/water (1:4) (225 c.c.) and allowed to separate. The organic layer was then washed with water/methanol (1:4) (3 × 500 c.c.), petroleum spirit (b.p. 62°–68° C) being added to assist separation. The solution was dried over magnesium sulphate, filtered and stripped to 170° C under vacuum.

1734 g (79%) of the intermediate was thus obtained.
Saponification value: 40.4 mg KOH/g.

A number of intermediate esters (Examples 5 to 19) were prepared by the same general method, details being given in Table 1. In certain cases, namely Examples 5–8 and 14, the acid treatment was omitted, and the number of aqueous methanol washes was reduced to 1 or 2. In some cases, the reaction solvent was mineral oil, as shown in Table 1.

EXAMPLE 20

Preparation of Tetraethylene pentamine amide of Polyisobutylphenoxyacetic acid

The product of Example 4 (1500 g, 1.03 m) was stirred with tetraethylenepentamine (119 g, 0.63 m) at 200° C, in an atmosphere of nitrogen for 4 hours. Evolved n-butanol was permitted to escape during the reaction. The product was cooled, diluted with mineral oil (276 g) and filtered in petroleum ether solution. Removal of the solvent gave the amide (1650 g, 91%).

% N 2.2; (calc. 2.2%)
Anhydrous TBN 51.5 mg KOH/g

EXAMPLES 21 TO 41

A number of amides were prepared by the same general method as for Example 20, full details being given in Table 2. Products were prepared as approximately 85% concentrates in mineral oil, except for Example No. 25 and also where the intermediates were prepared in oil, in which cases the final products were approximately 60% oil concentrates. One product (Example 39) was prepared without oil addition.

For some preparations, particularly where volatile amines were used, it was necessary to modify the preparative procedure. With dipropylene triamine (Example 29), the reactants were heated under reflux at 170° C for ½ hour, and at 200° C for 3 hours, and finally at 200° C for 1½ hours without a condenser. With ethylenediamine (Example 30) the reactants were heated under reflux in toluene solution for ½ hour, the toluene was distilled out, and heating was continued at 200° C for 3 hours, without a condenser. With dimethylaminopropylamine (Example 31), an excess of the amine was used, and the mixture was heated under reflux, at 160° C for 4 hours. The excess amine was distilled out, and the mixture was heated at 200° C for 3 hours.

EXAMPLE 42

A solution of sodium methoxide, prepared by dissolving sodium (12.7 g, 0.55m) in dry methanol (150 c.c.) was added slowly to a stirred solution of polyisobutyl phenol (from 1000 M.W. PIB) (571.5 g, 0.5 m) and n-butyl chloroacetate (83 g, 0.55 m) in mineral oil (438 g) at 70° C. Reaction was continued for 2 hours and the mixture was then vacuum-stripped at 190° C and filtered in petroleum ether solution. The resultant ester had a saponification value of 21.7 mg KOH/g.

600 g (0.23 m) of the ester were reacted for 4 hours at 200° C with TEPA (26.9 g, 0.14 m), and the product was filtered.

Yield:—550 g, 90%
% N:—1.5 (calc. 1.55%)
TBN:—39 mg KOH/g
Spot test rating: B

EXAMPLE 43

A further sample of n-butyl PIB phenoxyacetate was prepared in oil, as described in Example 42, except that the ester was vacuum-stripped in the presence of a filter-aid and was filtered neat.

1976 g (0.74 m) of this ester were reacted for 4 hours at 200° C with TEPA (70.0 g, 0.37 m) and the product was filtered.

Yield:—1920 g, 96%
% N:—1.2 (calc. 1.2%)
TBN:—30 mg KOH/g
Spot test rating: B

EXAMPLE 44

Preparation of N,N-dimethyl polyisobutyl phenoxyacetamide

A solution of sodium methoxide (5.7 g, 0.105 m) in dry methanol (28 c.c.) was added during 1 hour to a stirred solution of polybutyl phenol (ex 1000 M.W. PIB) (72.7 g, 0.07 m) and N,N-dimethyl chloroacetamide (12.8 g, 0.105 m) in xylene at 100° C. Reaction was continued for a further 1 hour and the solution was washed with 20% hydrochloric acid (3 × 50 c.c.) and with 80% aqueous methanol (3 × 80 c.c.).

Drying and removal of the solvent gave the product.
Yield: 71 g, 90%
% N: 1.0 (calc. 1.2%)

EXAMPLES 45 TO 47

Free amino groups in the amide of Example 40 were further reacted with an aldehyde to form a Schiff's base, and aldehyde and a phenol to form a Mannich base and with a carboxylic acid to form an amide. Details of these preparations are given in Table 3.

EXAMPLE 48

An intermediate ester, similar to that of Example 13 (900 g, 0.609 m) was reacted with TEPA (72.0 g, 0.381 m) at 200° C for 4 hours under nitrogen. Polyisobutenyl succinic anhydride (prepared from 650 M.W. PIB) (163 g, 0.153 m) was added and reaction was continued at 200° C for a further 4 hours. The mixture was cooled, diluent oil (192 g) was added, and the product was filtered in petroleum ether solution.

% N: 1.9 (calc. 1.9%)
TBN: 30 mg KOH/g
Panel coker rating: 69.5
Spot test rating: A Suitability of the products of the present invention for use as ashless dispersants in lubricants was determined by MS VC and Petter AV-B Engine tests, by Panel Coker Tests and by Spot Tests.

The VC tests were carried out by the standard method on two formulations containing test additives.

Formulation A was a 10W/30 blend, formulated to meet U.S. Specification MIL-L-46152, containing commercially available metal sulphonate detergents, viscosity index improver and antioxidant/antiwear additive and in which the ashless dispersant normally present (4.5%) was replaced by the test additive, also at 4.5% or at equivalent active dosage. The blend had a sulphated ash content of 1%. Formulation B was similar to formulation A, but having a sulphated ash content of 0.5% and containing ashless corrosion inhibitors.

After the tests, merit ratings were assigned according to the condition of the test engine in the usual way and these ratings were as follows:

| | FORMULATION A | | |
|---|---|---|---|
| Test Additive | Average Sludge (Max 10) | Average Varnish (Max 10) | Piston Skirt Varnish (Max 10) |
| -continued | | | |
| Product of Example 37 (5.3%) | 9.0 | 8.3 | 8.5 |
| Additive X (4.5%) | 4.9 | 7.5 | 7.2 |

| | FORMULATION B | | |
|---|---|---|---|
| Test Additive | Average Sludge (Max 10) | Average Varnish (Max 10) | Piston Skirt Varnish (Max 10) |
| Product of Example 20 (4.5%) | 9.0 | 8.3 | 8.5 |
| Product of Example 35 (6.4%) | 9.2 | 8.2 | 8.3 |

Additive X is a commercially available ashless dispersant consisting of a borated Mannich base of a polyisobutyl phenol.

The Petter AV-B tests were also carried out according to the standard procedure and merit ratings (maximum 10) assigned in the usual way according to the condition, after test of various parts of the test engine.

Carbon deposition in the grooves of the test engine were also measured. Groove carbon and the overall merit rating (maximum 100) derived from the individual ratings were as follows:

| Test Additive | Groove Carbon (%) | | | Overall Rating |
|---|---|---|---|---|
| | 1st. | 2nd. | 3rd. | |
| Product of Example 37 (4.06%) | 76.8 | 1.0 | Nil | 74.8 |
| Product of Example 36 | 10 | Nil | Trace | 91.4 |
| Product of repeat of Example 20 | 38 | Nil | Nil | 83.3 |
| Product of Example 42 (4.95%) | 66 | 3 | Nil | 70.3 |
| Product of Example 43 (4.95%) | 26.1 | Nil | Nil | 87.0 |
| Product of Example 34 | 69 | Nil | Nil | 80.4 |
| Additive X | 93.0 | 30.1 | 0.8 | 50.7 |

The test blend used in the AV-B tests was an SAE 30 blend, formulated to meet the requirements of U.S. Specification MIL-L-2104-C, containing commercially available metal sulphonate detergents, corrosion inhibitor and antioxidant/antiwear additive, and in which the ashless dispersant normally present (3.5%) was replaced by the test additive, also at 3.5% except where stated.

The Panel Coker tests were carried out using the same test blend as for the AV-B test and were carried out for 3½ hours in a slightly modified form of the normal apparatus. Instead of continuous oil splashing, the oil was splashed against the aluminum panel maintained at 600° F with a cycling procedure consisting of a splashing period of 15 seconds and a 45 second period when the paddle was stationary. The apparatus was further modified to allow a flow of moist air through the sump above the oil surface at the rate of 2.3 liters per hour.

The area of the sump not normally immersed in oil was rated according to the percentage cleanliness in much the same manner as an engine piston is rated after a test such as the Caterpillar 1-G test, to give a % Merit Rating (100 = Perfectly clean). It is believed that the above-mentioned test correlates well with the Caterpillar 1-G Engine Test.

In the spot tests the test additives were dissolved in mineral oil ($V_{210}$=3.5cS) at 4%, except where the additives had been prepared as 60% concentrates in oil in which cases 5.8% additive was used. Carbon black (Spheron 9- ex Cabot Carbon Coy - average particle size = 27 m) (1%) was added and the mixtures (10 g) were agitated for 1 hour, using an Ultrasonic Generator in 5 inch × 1 inch test-tubes. The tubes were then stored at 50° C for 16 hours and allowed to cool. Drops of oil, taken from the top ½inch, were spotted on to chromatography paper, using a fine glass rod. The spots were then allowed to develop for 24 hours, and rated as follows:
A = Carbon well dispersed
B = Carbon moderately well dispersed
C = Carbon poorly dispersed
D = Carbon not dispersed The ratings obtained in the Panel Coker and spot tests are recorded in the following Tables 2 and 3. The Panel Coker tests were carried out at a test additive concentration of 3.5% except where the products had been prepared as 60% concentrates in oil when 5.1% of the products was used. In the same Panel Coker test a rating of 61.2 was obtained with additive X. In the spot test a sample of the mineral oil without additive gave a D rating.

TABLE 1

| Ex. No. | PHENOL | g | moles | HALO ESTER | g | moles |
|---|---|---|---|---|---|---|
| 5 | Polyisobutyl[A] | 65.1 | 0.1 | Bu Cl Ac | 16.6 | 0.11 |
| 6 | Polyisobutyl[B] | 884.8 | 0.7 | " | 115.9 | 0.77 |
| 7 | Polyisobutyl[C] | 248 | 0.1 | " | 16.6 | 0.11 |
| 8 | Polypropyl[D] | 125.8 | 0.05 | " | 8.4 | 0.055 |
| 9 | Polyisobutyl[E] o-methyl | 56.2 | 0.03 | " | 4.96 | 0.033 |
| 10 | Dimethylene[E] tris-poly-isobutyl | 67 | | " | 11.9 | 0.078 |
| 11 | Thio-bis[E] polyisobutyl | 92.6 | 0.04 | " | 13.2 | 0.088 |
| 12 | 2-chloro-4-[E] polyisobutyl | 117.8 | 0.1 | " | 16.6 | 0.11 |
| 13 | Polyisobutyl[E] | 2857.5 | 2.5 | Et Cl Ac | 337 | 2.75 |
| 14 | Polyisobutyl[E] | 1143 | 1.0 | Bu Cl Ac | 165.6 | 1.1 |
| 15 | Polyisobutyl[E] | 445 | 0.5 | " | 82.6 | 0.55 |
| 16 | Polyisobutyl[E] | 1605 | 1.45 | " | 241 | 1.6 |
| 17 | Polyisobutyl[E] | 2857.5 | 2.5 | " | 413.9 | 2.75 |
| 18 | Polyisobutyl[E] | 228.6 | 0.2 | MDG Cl Ac | 43.3 | 0.22 |
| 19 | Polyisobutyl[E] | 114.3 | 0.1 | Et 2-Br But. | 21.5 | 0.11 |

| Ex. No. | SODIUM g (g atoms) | METHANOL (c.c.) | OTHER SOLVENT | c.c. | YIELD g (%) | SAPONIFICATON VALUE (mg KOH/g) | |
|---|---|---|---|---|---|---|---|
| 5 | 2.5 (0.11) | 35 | Pet. Ether 100/120 | 30 | 64.0 (84) | 65.2 | |
| 6 | 17.7 (0.77) | 230 | Oil | 641 (g) | 1450 (90) | 18.2 | |
| 7 | 2.5 (0.11) | 35 | Oil | 174 (g) | 423 (98) | 8.8 | |
| 8 | 1.27 (0.055) | 18 | Pet. Ether 100/120 | 60 | 113 (86) | 18.3 | |
| 9 | 0.76 (0.033) | 20 | Toluene | 30 | 57.5 (97) | 22.2 | |
| 10 | 1.8 (0.078) | 25 | Toluene | 35 | 73 (96) | 25.4 | |
| 11 | 2.0 (0.098) | 25 | Toluene | 70 | — | 37.8 | % S = 1.24 |
| 12 | 2.5 (0.11) | 30 | Toluene | 50 | — | 41.0 | |
| 13 | 63.3 (2.75) | 750 | Toluene | 1250 | — | 39.0 | |
| 14 | 25.3 (1.1) | 350 | Oil | 828 (g) | 1860 (89) | 20.2 | |
| 15 | Na OMe 29.7 (0.55) | 150 | Xylene | 500 | 357 (71) | — | |
| 16 | NaOMe 86.4 (1.6) | 450 | " | 1500 | — | — | |
| 17 | 63.3 (12.75) | 750 | Toluene | 1250 | 2953 (94) | 39.5 | |
| 18 | 5.0 (0.22) | 50 | " | 100 | 230 (88) | 39.4 | |
| 19 | 2.5 (0.11) | 35 | " | 50 | 118 (94) | 37.1 | |

[A]From PIB MW 440
[B]From PIB MW 1300
[C]From PIB MW 2000
[D]From Polypropylene M.W. 860
[E]From PIB M.W. 1000

ABBREVIATIONS
Bu Cl Ac = n-Butylchloroacetate
Et Cl Ac = Ethylchloroacetate
M.D.G. Cl Ac = Methyl diglycolester of chloroacetic acid
Et 2 Br But = Ethyl 2-bromobutyrate

TABLE 2

| Ex. No. | Product of Ex. No. | INTERMEDIATE USED DERIVED FROM | | g | moles | AMINE | g | moles |
|---|---|---|---|---|---|---|---|---|
| | | PHENOL | ESTER | | | | | |
| 21 | 5 | Polyisobutyl[A] | Bu Cl Ac | 30 | 0.034 | DETA | 2.4 | 0.023 |

TABLE 2-continued

| | | | | | | | | |
|---|---|---|---|---|---|---|---|---|
| 22 | 6 | Polyisobutyl[B] | " | 1300[F] | 0.43 | TEPA | 53.6 | 0.28 |
| 23 | 7 | Polyisobutyl[C] | " | 200[F] | 0.032 | " | 4.36 | 0.023 |
| 24 | 8 | Polypropyl[D] | " | 50 | 0.016 | TETA | 1.59 | 0.011 |
| 25 | 9 | Polyisobutyl-[E] o-methyl | " | 25 | 0.011 | " | 1.59 | 0.011 |
| 26 | 10 | Dimethylene[E] tris polyisobutyl | " | 50 | 0.023 | "Polyamine M" | 2.14 | 0.011 |
| 27 | 11 | Thio-bis[E] polyisobutyl | " | 40 | 0.027 | PEHA | 3.1 | 0.013 |
| 28 | 12 | 2-chloro-4-[E] polyisobutyl | " | 60 | 0.044 | TEPA | 4.4 | 0.023 |
| 29 | 13 | Polyisobutyl[E] | Et Cl Ac | 73.2 | 0.05 | Dipropylene triamine | 3.28 | 0.025 |
| 30 | 13 | Polyisobutyl[E] | " | 73.2 | 0.05 | Ethylene diamine | 3.0 | 0.05 |
| 31 | 13 | Polyisobutyl[E] | Et Cl Ac | 73.2 | 0.05 | DMAPA | 10.4 | 0.1 |
| 32 | 13 | Polyisobutyl[E] | " | 73.2 | 0.05 | BAPP | 10.0 | 0.05 |
| 33 | 13 | Polyisobutyl[E] | " | 73.2 | 0.05 | 2-AEEA | 5.2 | 0.05 |
| 34 | 13 | Polyisobutyl[E] | " | 1000 | 0.68 | TMM | 91 | 0.75 |
| 35 | 14 | Polyisobutyl[E] | Bu Cl Ac | 1680[F] | 0.6 | TEPA | 56.7 | 0.3 |
| 36 | 15 | Polyisobutyl[E] | " | 341.4 | 0.26 | TEPA | 32.1 | 0.17 |
| 37 | 16 | Polyisobutyl[E] | " | 1136 | 0.67 | TEPA | 87.9 | 0.47 |
| 38 | 17 | Polyisobutyl[E] | " | 70 | 0.047 | GITP | 5.6 | 0.023 |
| 39 | 18 | Polyisobutyl[E] | MDG Cl Ac | 130.3 | 0.1 | TEPA | 9.5 | 0.05 |
| 40 | 13 | Polyisobutyl[E] | Et Cl Ac | 600 | 0.41 | TEPA | 48.5 | 0.26 |
| 41 | 19 | Polyisobutyl[E] | Et 2 Br But | 20 | 0.03 | TEPA | 1.25 | 0.015 |

| Ex. No. | OIL g | YIELD g (%) | %N FOUND (calc.) | ANHYDROUS TBN (mg KOH/g) | PANEL COKER TEST RATING | SPOT TEST RATING |
|---|---|---|---|---|---|---|
| 21 | 5.3 | 31 (88) | 2.4 (2.8) | 40 | 63.3 | B |
| 22 | — | 1188 (90) | 1.33 (1.36) | 30 | 80.7 | B |
| 23 | — | 184 (91) | 0.70 (0.73) | 18 | 84.0 | A |
| 24 | 8.9 | 59 (99) | 0.9 (1.0) | 19 | 88.2 | B/C |
| 25 | 16.8 | 41 (96) | 0.7 (0.75) | 19 | 92.3 | B |
| 26 | 8.9 | 58 (98) | 1.0 (1.2) | 17 | 89.3 | A/B |
| 27 | 7.0 | 43 (90) | 1.9 (2.2) | 33 | 65.8 | A |
| 28 | 10.7 | — | 1.7 (2.1) | 35 | 82.2 | A |
| 29 | 13.1 | 83 (96) | 1.2 (1.2) | 13.5 | 80.5 | B |
| 30 | 13.0 | 83.5 (98) | 1.1 (1.6) | 15 | 64 | A |
| 31 | 13.4 | 85.5 (92) | 1.6 (1.6) | 32 | — | C/D |
| 32 | 14.3 | 90 (95) | 2.5 (2.9) | 67 | 73.5 | D |
| 33 | 13.4 | 86 (98) | 1.4 (1.6) | 18 | 67 | B |
| 34 | 186 | 1173 (96) | 0.8 (0.8) | 21 | 72.5 | B/C |
| 35 | — | 1610 (95) | 1.1 (1.1) | 27 | 82.2 | B/C |
| 36 | 65.1 | 360 (87) | 2.6 (2.6) | 69.5 | 72.5 | C |
| 37 | 204 | 1341 (97) | 1.9 (2.1) | 52 | 67.7 | B |
| 38 | 12.7 | 83 (97) | 2.2 (2.4) | 21 | 80 | A |
| 39 | — | 112 (88) | 2.2 (2.7) | 46 | — | — |
| 40 | 111 | 640 (88) | 2.3 (2.2) | 55.5 | 66.7 | — |
| 41 | 3.6 | — | 1.3 | 29 | 81.5 | B |

TABLE 2-continued (1.7)

$^A$From PIB MW 440
$^B$From PIB MW 1300
$^C$From PIB MW 2000
$^D$From Polypropylene MW 860
$^E$From PIB MW 1000
$^F$approx 60% oil solution ABBREVIATIONS
Bu Cl Ac = n-Butyl chloroacetate
Et Cl Ac = Ethyl chloroacetate
Et 2 Br But = Ethyl 2-bromobutyrate
MDG Cl Ac = Methyl Diglycol ester of chloroacetic acid
DETA = Diethylene triamine
TETA = Triethylenetetramine
TEPA = Tetraethylene pentamine
PEHA = Pentaethylene hexamine
DMAPA = 3-Dimethylamino-propylamine
BAPP = 1,4-Bis aminopropyl piperazine
2-AEEA = 2-Aminoethyl ethanolamine
TMM = Tris methylol methylamine
"Polyamine M" = Mixed polyamines approximating to TEPA
GITP = Complex reaction product of TEPA and dicyandiamide

TABLE 3

| Ex. No. | PRODUCT OF EXAMPLE 40 g | OTHER | REACTANTS g | moles | REACTION CONDITIONS | %N FOUND (calc.) | TBN mg KOH/g | PANEL COKER RATING | SPOT TEST RATING |
|---|---|---|---|---|---|---|---|---|---|
| 45 | 100 | Benzaldehyde | 2.93 | 0.28 | a) 150° C/ 2 hrs b) 200° C/ 2 hrs | 2.0 (2.15) | 45 | 73 | A/B |
| 46 | 100 | 40% Formalin Polyisobutyl Phenol$^A$ | 2.5 24.2 | 0.306 0.028 | a) In toluene solution at 90° C/2 hrs b) Refluxing toluene with water removal | 1.8 (1.8) | 40.5 | 75.5 | B/C |
| 47 | 100 | Isostearic Acid | 3.94 | 0.014 | 200° C/4 hrs | 2.0 (2.1) | 41.5 | 68 | A/B |

$^A$from PIB MW 650

We claim:

1. A lubricating oil dispersant containing an polyisobutyl phenoxy substituted acetic amide, said dispersant being prepared by the process comprising (i) reacting an polyisobutyl substituted phenol wherein said polyisobutyl substitutent contains from 50 to 200 carbon atoms with a $C_{1-4}$ alkyl chloracetic ester to form an intermediate mixture containing polyisbutyl-phenoxy-substituted acetic ester, and (ii) reacting said intermediate mixture with an ethylene polyamine without removing unreacted $C_{50-200}$ polyisobutylphenol to convert said acetic ester to carboxylic amide, said dispersant having a high amide and low polyisobutylphenol content.

2. A dispersant of claim 1 wherein said reacting of a poly-alpha-olefin substituted phenol with an α-chlorocarboxylic ester is carried out in the presence of a base which functions as a HCl acceptor.

3. A dispersant of claim 1 wherein said polyethylene polyamine has an average composition of tetraethylene pentamine.

4. A dispersant of claim 1 wherein said alkyl chloroacetic ester is butyl-α-chloroacetate.

5. Lubricating oil containing a dispersant amount of a dispersant of claim 1.

6. An additive concentrate containing a minor amount of lubricating oil and a major amount of a dispersant of claim 1.

* * * * *

UNITED STATES PATENT AND TRADEMARK OFFICE
CERTIFICATE OF CORRECTION

PATENT NO. : 4,083,791
DATED : April 11, 1978
INVENTOR(S) : John Scotchford Elliott et al It is certified that error appears in the above-identified patent and that said Letters Patent are hereby corrected as shown below:

On the cover page under "(30) Foreign Application Priority Data" - "Jul. 23, 1974 United Kingdom ... 35732/74" should be -- Jul. 26, 1973 United Kingdom ... 35732/73 --

Signed and Sealed this

Fourth Day of September 1979

[SEAL]

*Attest:*

LUTRELLE F. PARKER
*Attesting Officer*     *Acting Commissioner of Patents and Trademarks*